United States Patent [19]

Han

[11] Patent Number: 5,208,432
[45] Date of Patent: May 4, 1993

[54] MAGNETRON DRIVING POWER SUPPLY CIRCUIT

[75] Inventor: Gyeong H. Han, Seoul, Rep. of Korea

[73] Assignee: Goldstar Co., Ltd., Seoul, Rep. of Korea

[21] Appl. No.: 684,227

[22] Filed: Apr. 12, 1991

[30] Foreign Application Priority Data

Apr. 14, 1990 [KR] Rep. of Korea ............ 4546/1990

[51] Int. Cl.[5] ............................................ H05B 6/68
[52] U.S. Cl. ................................. 219/10.55 B; 363/21
[58] Field of Search .............. 219/10.55 B; 363/21, 363/97, 98

[56] References Cited

U.S. PATENT DOCUMENTS

| | | | |
|---|---|---|---|
| 4,318,165 | 3/1982 | Kornrumpf et al. | 363/21 |
| 4,873,408 | 10/1989 | Smith et al. | 219/10.55 B |
| 4,886,951 | 12/1989 | Matsumoto et al. | 219/10.55 B |
| 4,920,246 | 4/1990 | Aoki | 219/10.55 B |
| 4,933,830 | 6/1990 | Sato et al. | 363/21 |
| 5,124,518 | 6/1992 | Lee | 219/10.55 B |

FOREIGN PATENT DOCUMENTS 61-240588 10/1986 Japan.

*Primary Examiner*—Philip H. Leung
*Attorney, Agent, or Firm*—Rosen, Dainow & Jacobs

[57] ABSTRACT

A magnetron driving power supply circuit comprising a control circuit. The control circuit includes a microprocessor for determining potential level of a reference voltage in response to detected signals from a current level detecting circuit and a voltage level detecting circuit. The control circuit also includes a triangular wave generator for outputting a signal to be compared with the reference voltage and generating a switching drive control signal. Therefore, the magnetron driving power supply circuit of the present invention can be applied to commercial power sources of different types without design modification.

2 Claims, 5 Drawing Sheets

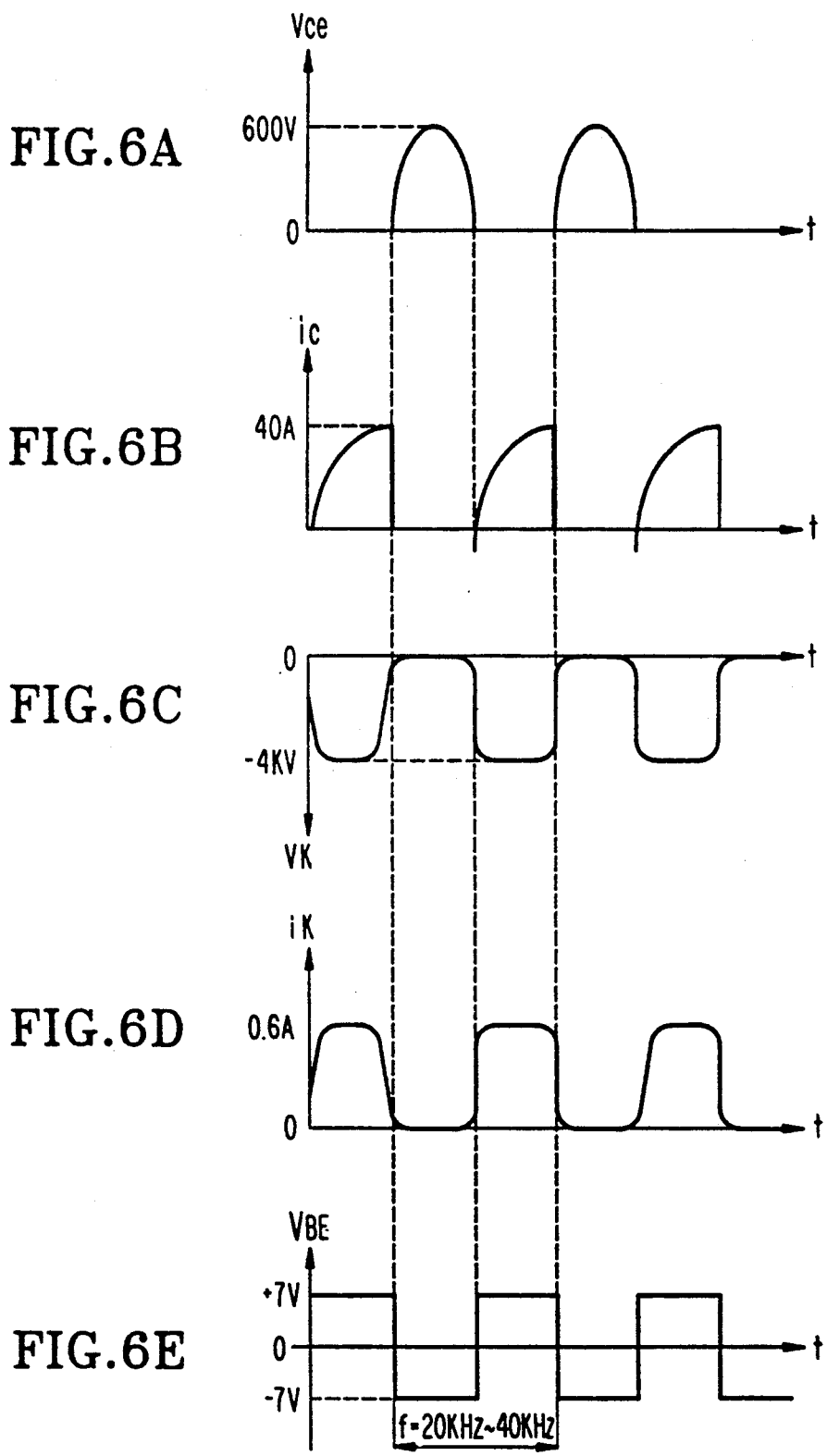

MAGNETRON DRIVING POWER SUPPLY CIRCUIT

BACKGROUND OF THE INVENTION

The present invention relates to a magnetron driving power supply circuit in an electronic range and more particularly to a magnetron driving power supply circuit of the small, light inverter type for the use of the electronic range in commercial power sources with commercial voltages (AC 110 V/220 V) and frequencies (50/60 Hz).

In electronic ranges, there have been conventionally used the magnetron driving power supply circuits of the ferro-resonance transformer type wherein a ferro-resonance transformer may be used and the inverter type wherein a high voltage may be obtained by switching a boosting transformer at high speed.

FIG. 1 is a schematic diagram of the conventional magnetron driving power supply circuit of the ferro-resonance transformer type. As shown in the drawing, the magnetron driving power supply circuit comprises a ferro-resonance transformer T1 having its primary coil connected to a commercial power source (AC) via a switch SW1 and its secondary coil connected to a magnetron MGT via a high voltage condenser C1 and a high voltage diode D1. This circuit constitutes a half-wave voltage doubler rectifier circuit which doubles output voltage from the secondary coil during half cycles and supplies the doubled voltage to the magnetron MGT.

When AC 110 V power is supplied from the commercial power source (AC), the switch SW1 is connected to an AC 110 V selecting terminal (a) of the primary coil of the ferro-resonance transformer T1 to apply the AC 110 V power from the commercial power source (AC) to the primary coil. On the other hand, when AC 220 V power is supplied from the commercial power source (AC), the switch SW1 is connected to an AC 220 V selecting terminal (a) of the primary coil of the ferro-resonance transformer T1 to apply the AC 220 V power from the commercial power source (AC) to the primary coil. Therefore, a constant voltage can be outputted from the secondary coil of the ferro-resonance transformer T1 by the adjustment of the number of windings of the primary coil and the secondary coil of the ferro-resonance transformer T1.

Therefore, when AC 110 V power is supplied from the commercial power source (AC), the switch SW1 is connected to the AC 110 V selecting terminal (a) of the primary coil of the ferro-resonance transformer T1 and therefore applies the AC 110 V power from the commercial power source (AC) to the primary coil. Then the AC 100 V voltage is boosted by the ferro-resonance transformer T1 up to about AC 2000 V to be outputted from the secondary coil. Thereafter, the AC 2000 V voltage from the secondary coil of the ferro-resonance transformer T1 is doubled by the half-wave voltage doubler rectifier circuit comprised of a high voltage condenser C1 and a high voltage diode D1 during half cycle.

As a result, about 4000 V power obtained in this manner is supplied to the magnetron MGT to drive it.

However, the above-mentioned conventional magnetron driving power supply circuit of the ferro-resonance transformer type can not be small and light because of large sizes and volumes of its ferro-resonance transformer and its high voltage condenser. Further, its design has to be modified depending upon the commercial frequency (50 Hz/60 Hz).

FIG. 2 is a schematic diagram of the conventional magnetron driving power supply circuit of the inverter type. As shown in the drawing, the magnetron driving power supply circuit comprises a noise stopping coil L1 for inputting AC power from a commercial power source (AC) and stopping noise of the AC power, a bridge diode BD1 for rectifying output power from the noise stopping coil L1, a condenser C2 for smoothing the rectified power from the bridge diode BD1, and a resonance condenser C3 for inputting the smoothed power from the condenser C2 through an overcurrent stopping choke coil L2. The power supply circuit also comprises a boosting transformer T2 having its primary coil for inputting the smoothed power from the condenser C2 through the overcurrent stopping choke coil L2 and a switching transistor Q1 connected to the resonance condenser C3 and the primary coil of the boosting transformer T2 for switching at high speed to control current flowing through the resonance condenser C3 and the primary coil of the boosting transformer T2. The supply circuit also comprises a protecting diode D2 connected to the resonance condenser C3 and the primary coil of the boosting transformer T2 for protecting the transistor Q1, a current detector 1 for detecting the current flowing through the primary coil of the boosting transformer T2 via and a current transformer CT, a switching controller 2 responsive to the detected current signal from the current detector 1 for outputting a switching control signal. The supply circuit also comprises a switching transistor driver 3 responsive to the switching control signal from the switching controller 2 for controlling the ON/OFF operation of the transistor Q1, and a high voltage condenser C1 and a high voltage diode D1 which constitute a half-wave voltage doubler rectifier circuit which doubles high voltage output from a secondary coil of the boosting transformer T2 during half cycles and supplies the doubled voltage to a magnetron MGT to drive the magnetron MGT.

The switching transistor Q1 is switched at high speed, about 20 KHz–40 KHz in response to the switching control signal that the switching controller 2 outputs in response to the detected current signal from the current detector 1, so that it controls the current flowing through the primary coil of the boosting transformer T2. Therefore, AC 2000 V voltage of high frequency is induced in the secondary coil of the boosting transformer T2. Then the AC 2000 V voltage from the secondary coil is doubled by the half-wave voltage doubler rectifier circuit comprised of high voltage condenser C1 and high voltage diode D1 during half cycles to drive the magnetron MGT. On the other hand, voltage induced in another secondary coil of the boosting transformer T2 is supplied to a filament of the magnetron MGT.

However, because a high voltage of high frequency is induced in the secondary coil of the boosting transformer T2, a reactance is small, resulting in small volume of the boosting transformer T2 and small capacity of the high voltage condenser C1.

Therefore, the magnetron driving power supply circuit of the inverter type has weight reduced by about ¼ relative to a magnetron driving power supply circuit of the ferro-resonance transformer type. This is because of the small volume of its boosting transformer T2 and the small capacity of its high voltage condenser C1 as stated previously. Therefore, the supply circuit can be smaller and lighter.

The conventional magnetron driving power supply circuit of the inverter type as above-mentioned, however, cannot be applied to commercial power sources of the different types at a time, since capacities of its boosting transformer T2 and its high voltage condenser C1 have to be modified depending upon AC 110 V/220 V powers from commercial power sources.

SUMMARY OF THE INVENTION

Therefore, it is an object of the present invention to provide a magnetron driving power supply circuit which can be applied to commercial power sources of the different types at a time without its design modification.

It is another object of the present invention to provide a magnetron driving power supply circuit in which a standard resonance transformer component and a standard high voltage condenser component can be used without their further development.

In accordance with the present invention, the objects can be accomplished by providing a magnetron driving power supply circuit comprising an input power rectifying means for inputting power from a commercial power source, stopping noise of the power and rectifying the noise-stopped power, a variable smoothing means including a relay switch for smoothing the rectified output power from the input power rectifying means as its different capacities depending upon switching states of the relay switch, and a magnetron driving means including a magnetron for inputting the smoothed output power from the variable smoothing means and switching the smoothed output power at high speed to boost it up to high voltage in order to drive said magnetron. The power supply circuit also comprises a low voltage transformer for inputting the power from the commercial power source and dropping the power, a low voltage rectifying means for rectifying output power from said low voltage transformer, a low voltage smoothing means including a relay switch for smoothing the rectified output power from the low voltage rectifying means as its different capacities depending upon switching states of the relay switch, a relay driving means for inputting the output power from the low voltage transformer and controlling open/close operations of the relay switches depending upon output voltage levels from the low voltage transformer. The supply circuit also comprises a current level detecting means for detecting input current level to the magnetron driving means, a voltage level detecting means, a constant voltage output means for inputting output voltage from the low voltage smoothing means to output a constant voltage, a control circuit means for inputting output voltage from the constant voltage output means as a drive voltage and outputting a switching drive control signal in response to the detected signals from the current level detecting means and the voltage level detecting means, and a high speed switching means for controlling high speed switching operation of the magnetron driving means in response to the switching drive control signal from the control circuit means.

BRIEF DESCRIPTION OF THE DRAWINGS

The above and other objects, features and advantages of the present invention will be more clearly understood from the following detailed description taken in conjunction with the accompanying drawings, in which:

FIGS. 6A to 6E are waveform diagrams of components shown in FIG. 3.

DETAILED DESCRIPTION OF PREFERRED EMBODIMENTS

Figure 1:
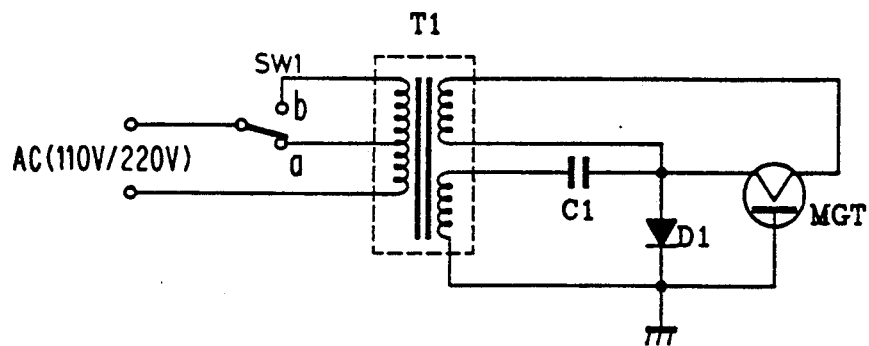
FIG. 1 is a schematic diagram of a conventional magnetron driving power supply circuit of the ferro-resonance transformer type.
Figure 2:
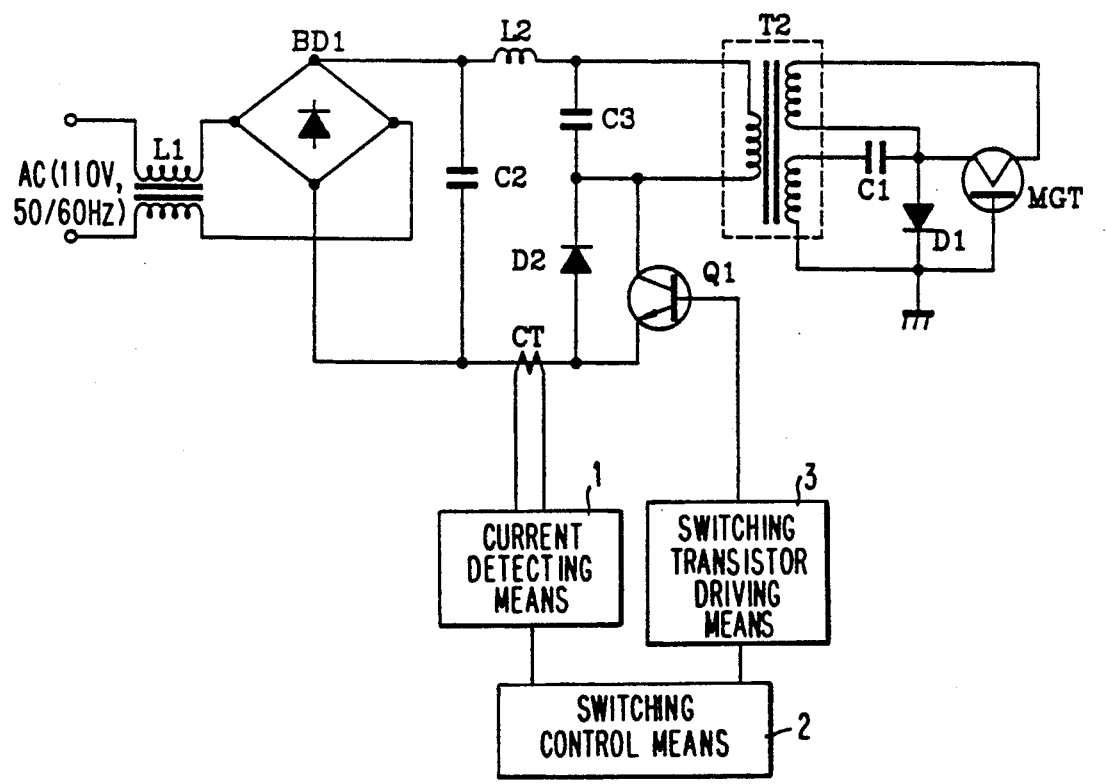
FIG. 2 is a schematic diagram of a conventional magnetron driving power supply circuit of the inverter type.
Figure 3:
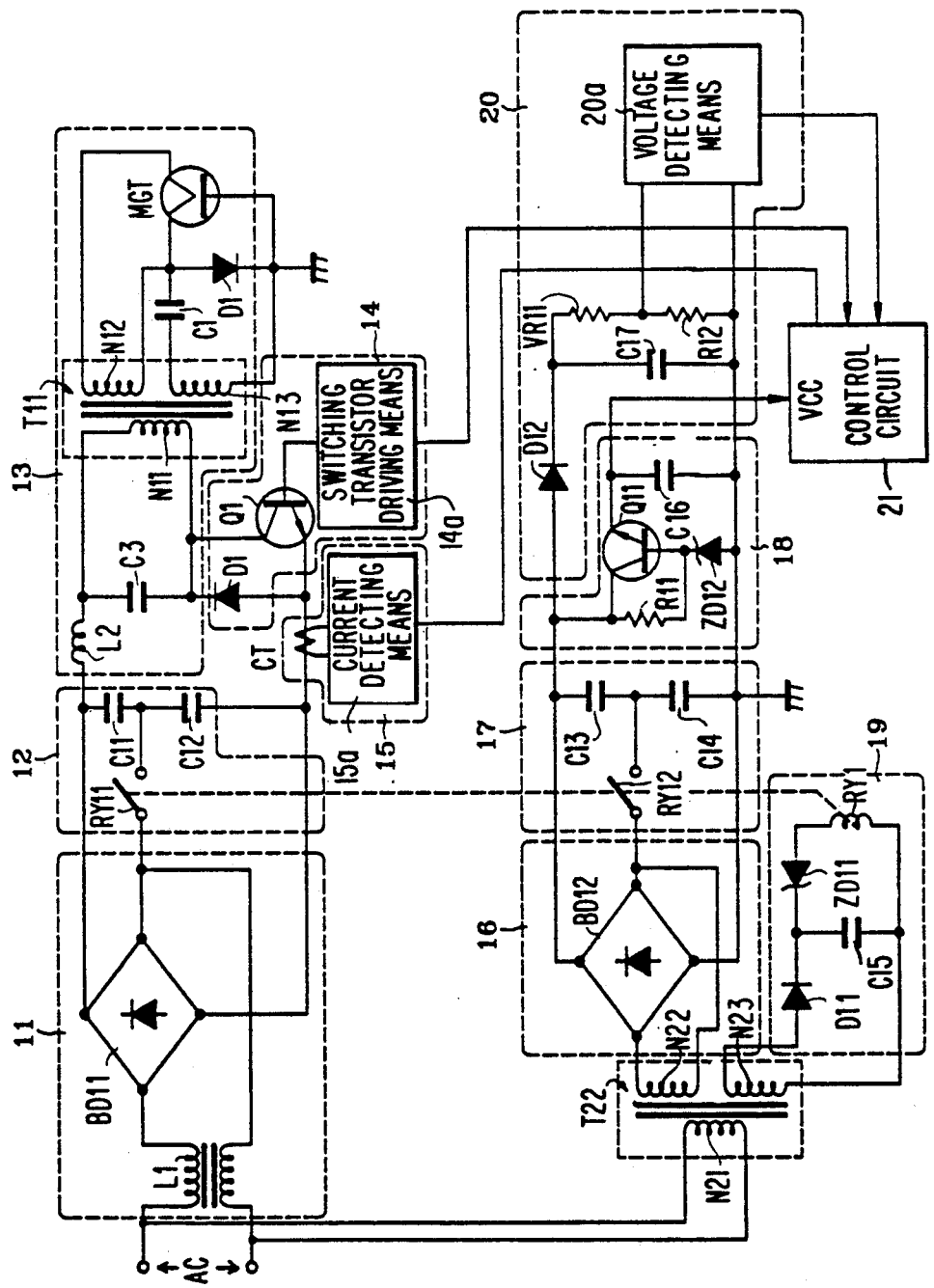
FIG. 3 is a schematic diagram of a magnetron driving power supply circuit of the present invention.

FIG. 3 is a schematic diagram of a magnetron driving power supply circuit of the present invention. As shown in the drawing, the magnetron driving power supply circuit of the present invention comprises an input power rectifying means 11 including a noise stopping coil L1 for inputting AC power from a commercial power source (AC) and stopping noise of the AC power, and a bridge diode BD11 for rectifying the noise-stopped output power from the noise stopping coil L1. The supply circuit also comprises a variable smoothing means 12 including a relay switch RY11 and condensers C11 and C12 for smoothing the rectified output power from the input power rectifying means 11 depending upon switching states of the relay switch RY11, a capacity of each condenser varying with switching states of the relay switch RY11, a magnetron driving means 13 including a magnetron MGT having a filament, an overcurrent stopping choke coil L2 for inputting the smoothed DC power from the variable smoothing means 12 and stopping overcurrent of the DC power, and a resonance condenser C3 for inputting the overcurrent-stopped output power from the overcurrent stopping choke coil L2 and resonating the power. The supply circuit also comprises a high voltage transformer T11 having its primary coil N11 for inputting the smoothed DC power from the variable smoothing means 12 and resonating the power in association with the resonance condenser C3. One secondary coil N13 and its other secondary coil N12 of the transformer T11 are present for outputting the self-induced voltage to the filament of the magnetron MGT, and in conjunction with a high voltage condenser C1 and a high voltage diode D1 constitute a half-wave voltage doubler rectifier circuit which doubles high voltage output from the secondary coil N13 of the high voltage transformer T11 during half cycles and supplies the doubled voltage to the magnetron MGT to drive the magnetron MGT. The supply circuit also comprises a high speed switching means 14 including a switching transistor driver 14a for outputting a switching drive signal and a switching transistor Q1 responsive to the switching drive signal from the switching transistor driver 14a for being switched at high speed to control DC power supplied to the primary coil of the high voltage transformer T2 and the resonance condenser C3, and a low voltage transformer T22 for inputting AC power from the commercial power source (AC) and dropping the AC power, the low voltage transformer T22 having a primary coil N21 and secondary coils N22 and N23. The supply circuit also comprises a low voltage rectifying means 16 including a bridge diode BD12 for rectifying output power from the secondary coil N22 of the low voltage transformer T22, a low voltage smoothing means 17 including a relay switch RY12 and condensers C13 and C14 for smoothing the rectified output power from the low voltage rectifying means 16 depending upon switching states of the relay switch RY12, the capacity of each condenser varies with switching states of the relay switch RY12. The supply circuit also comprises a relay driving means 19 including a relay RY1 adapted to open/close the relay switches RY11 and RY12 of the variable switching means 12, a diode D11 rectifying AC power inputted from the secondary coil N23 of the low voltage transformer T22, a condenser C15 smoothing the output from said diode D11, and a zener diode ZD11 adapted to control the drive of said relay RY1. The supply circuit also comprises a voltage level detecting means 20 including a diode D12 rectifying the output voltage of the low voltage smoothing means 17, a condenser C17 smoothing the output from said diode D12, a variable resistor VR11 and a resistor R12 dividing the smoothed output from said condenser C17, and a voltage detector 20a detecting the divided voltage. The supply circuit also comprises a current level detecting means 15 including a current detector 15a and a current transformer CT detecting current flowing according to the switching of the high speed switching means 14, a constant voltage output means 18 including a transistor Q11 receiving at its collector and base the output voltage of the low voltage smoothing means 17 and a zener diode ZD12 receiving the output voltage of the low voltage smoothing means 17 through a resistor R11, and a condenser C16, in order to output a constant voltage, and a control circuit means 21 including a microprocessor 21a receiving the output voltage of said constant voltage output means 18 as the operating voltage and applying a switching drive control signal to the switching transistor driver 14a of the high speed switching means 14 in response to detecting signals of the voltage level detecting means 20 and the current level detecting means 15.

Figure 4:
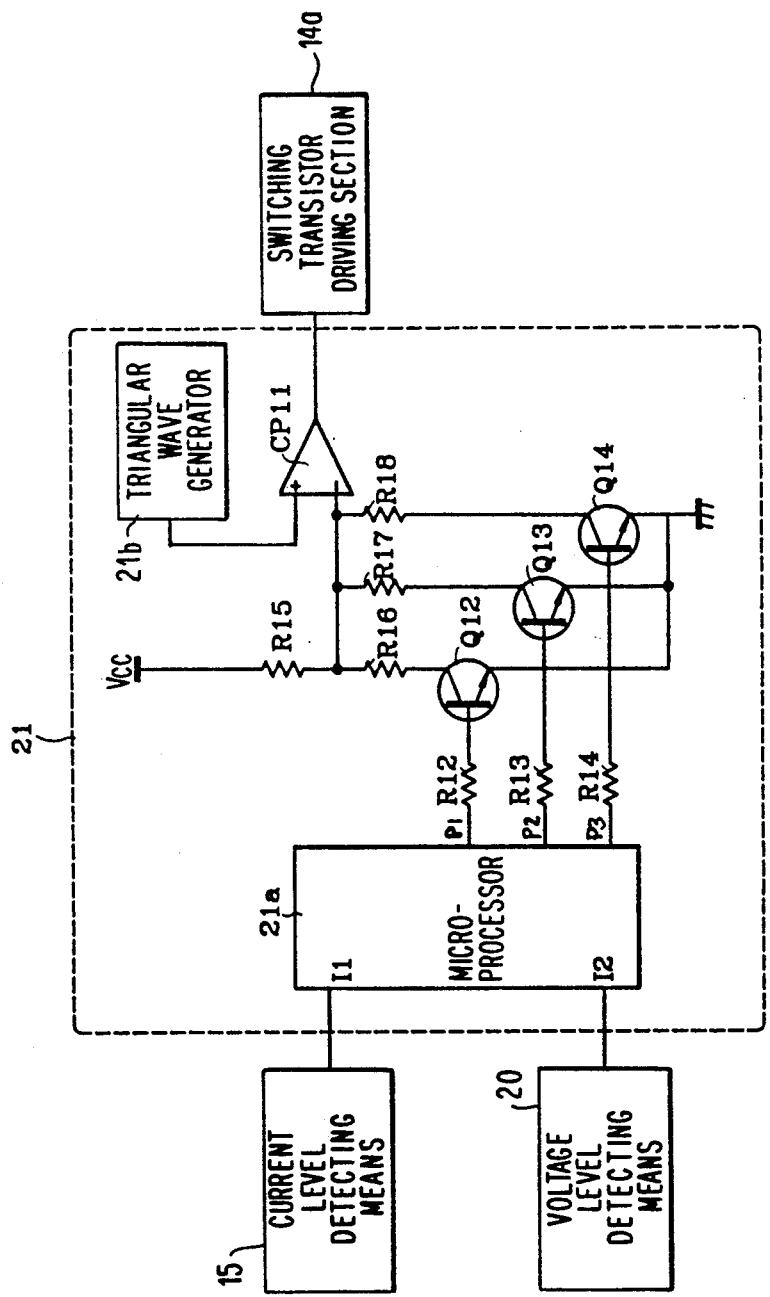
FIG. 4 is a detailed diagram of a control circuit means shown in FIG. 3.

FIG. 4 is a detailed diagram of the control circuit means 21 shown in FIG. 3. As shown in the drawing, the control circuit means 21 comprises a microprocessor 21a having input terminals I1 and I2 to which detected signals from the current level detector 15 and the voltage level detector 20 are applied, respectively, The control circuit means 21 also comprises transistors Q12 to Q14 having bases connected to output terminals P1 to P3 of the microprocessor 21a via resistors R12 to R14, respectively. The transistors Q12 to Q14 also have collectors connected, via resistors R16 to R18, respectively, to the inverting input terminal (—) of a comparator CP11 and a resistor R15 which is connected to a voltage source terminal Vcc of the control circuit means 21. At ON state, the transistors Q12 to Q14 apply different levels of reference voltage to the inverting input terminal (—) of the comparator CP11. A triangular wave generator 21b is connected to the non-inverting input terminal of the comparator CP11, thereby causing its output signal to be applied to the comparator CP11 as a comparative signal. The output terminal of the comparator CP11 is connected to the switching transistor driver 14a of the high switching means 14, so that square signal of high frequency from the comparator CP11 can be applied to the switching transistor driver 14a, as a switching drive control signal.

Now, the operation of the circuit of the present invention will be described in detail.

When AC power is supplied from the commercial electric power source (AC) to the input power rectifying means 11, the noise stopping coil L1 functions to stop noise of the AC power. Then, the noise-stopped power is rectified by the bridge diode BD11 throughout full cycle. The AC power rectified in the input power rectifying means 11 is smoothed in the variable smoothing means 2. This smoothed power is then applied to the resonance condenser C3 and the primary coil N11 of the high voltage transformer T11 via the overcurrent stopping shock coil L2. At this time, the switching transistor Q1 is switched at high speed to be repeatedly turn-on/off, in response to switching drive signal outputted from the transistor driver 4-1 of the high speed switching means 14.

According to the high speed switching of the high speed switching means 14, high voltage of about 2,000 V is induced in the secondary coil N13 of the high voltage transformer T11 and then doubled during a half cycle to be 4,000 V. This high voltage drives the magnetron MGT. On the other hand, the induced voltage outputted from the secondary coil N12 of the high voltage transformer T11 is supplied to the magnetron MGT as a filament heating voltage.

On the other hand, the AC power supplied from the commercial electric power source (AC) is also voltage-dropped in the low voltage transformer T2 and then outputted from its secondary coils N22 and N23. The AC power outputted from the secondary coil N22 is rectified in the bridge diode BD12, while the AC power outputted from the secondary coil N23 is rectified in the diode D11, smoothed in the condenser C15, and then applied to the zener diode ZD11. If the zener voltage of the zener diode ZD11 is preset to be slightly lower than the voltage smoothed in the condenser C15, in the case of the commercial electric power of 220 V, the zener diode ZD11 conducts and drives the relay RY1, thereby causing the relay switches RY11 and RY12 to be opened. On the other hand, when the commercial electric power is 110 V, the zener diode ZD11 does not conduct, so that the relay RY1 does not drive, thereby causing the relay switches RY11 and RY12 to be closed. Thus, the smoothing capacity of the variable smoothing means 12 and the smoothing capacity of the low voltage smoothing means 17 are determined, depending upon opening/closing of the relay switches RY11 and RY12 which depend upon 220 V/110 V of the commercial electric power, respectively.

Figure 5A:
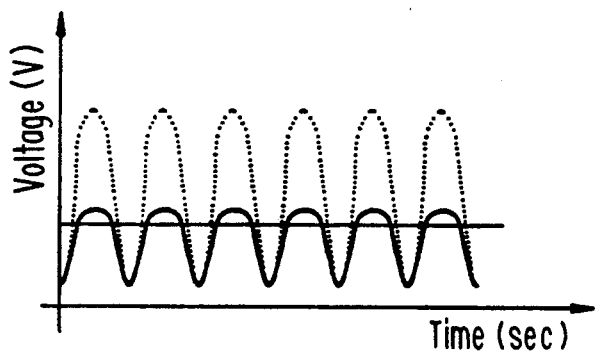
FIGS. 5A to 5C are waveform diagrams of the voltage applied across a smoothing condenser depending upon the capacity of the smoothing condenser.
Figure 5B:
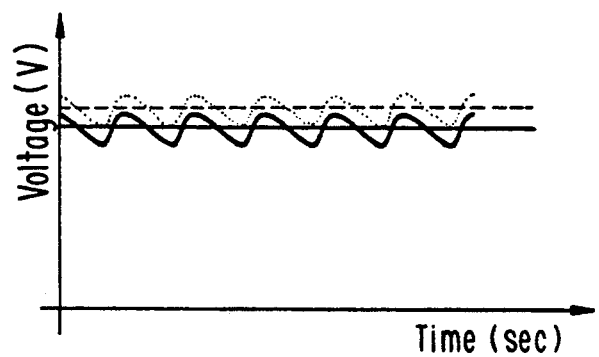
Figure 5C:
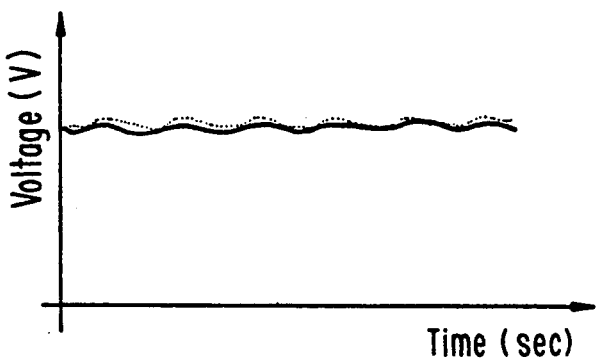

FIGS. 5A to 5C are waveform diagrams of the voltage applied across the smoothing condenser. The voltage depends upon the capacity of the smoothing condenser. Specifically, FIG. 5A shows a voltage waveform for a smoothing condenser with small capacity. FIG. 5B shows a voltage waveform for a smoothing condenser with medium capacity. FIG. 5C shows a voltage waveform for a smoothing condenser with large capacity. As shown in FIGS. 5A to 5C, it is well known that the voltage difference between the doubled voltage in the case of low input power (indicated as a solid line in FIG. 5 as 110 V) and the doubled voltage in the case of high input power (indicated as a dotted line in FIG. 5 as 220 V) is large in the case of the smoothing condenser with small capacity as indicated in FIG. 5A and small in case of the smoothing condenser with large capacity as indicated in FIG. 5C. Therefore, if the commercial electric power source (AC) supplies a low voltage of 110 V, the relay switch RY11 is closed, as above described. As a result, a loop consisting of the bridge diode BD11, the smoothing condenser C11, and the relay switch RY11 is formed during an upper half cycle of the input power, while the other condenser C12 does not operate. During a lower half cycle of the input power, the smoothing condenser C11 does not operate, even though electric potential charged in the smoothing condenser C12 through the relay switch RY11 is transmitted to one end of the smoothing condenser C11 through the bridge diode BD11. This is because the charged electric potential of the smoothing condenser C12 is applied to the other end of the smoothing condenser C11, thereby causing the potential difference across the smoothing condenser C11 to be a reverse potential difference of the bridge diode BD11 enough to conduct only one diode. Thus, when the input power is supplied from the 110 V commercial electric power source (AC), the relay switch RY11 is closed, thereby causing the input power to be smoothed through the smoothing condenser C11 or the smoothing condenser C12.

On the other hand, when the input power is supplied from the 220 V commercial electric power source (AC), the relay switch RY11 is opened, thereby causing both smoothing condensers C11 and C12 to act their smoothing functions (C11+C12). Accordingly, if each smoothing capacity of smoothing condensers C11 and C12 is medium, the voltage smoothed in and outputted from the variable smoothing means 12 is substantially constant, irrespective of 110 V/220 V supplied from commercial electric power sources (AC).

The low voltage smoothing means 17 also varies its smoothing capacity to act its smoothing function, depending upon 110 V/220 V supplied from commercial electric power sources (AC), as in the case of the variable smoothing means 12.

The output voltage of the low voltage smoothing means 17 is rectified in the diode D12, smoothed in the condenser C17, and then divided in the variable resistor VR11 and the resistor R12. The magnitude of the divided voltage is detected in the voltage detector 20a. Thereafter, the voltage is applied to the input terminal I2, in order to control switching speed by analogizing the voltage smoothed in the variable smoothing means 12 therefrom.

The output voltage of the low voltage smoothing means 17 is also applied to the collector of the transistor Q11 and applied to the base of said transistor Q11 and zener diode ZD12 through the resistor R11. Accordingly, the constant voltage output means 18 outputs a constant voltage corresponding to the zener voltage of the zener diode ZD12. The voltage is applied to the voltage source terminal Vcc of the control circuit means 21, as a drive voltage.

On the other hand, the current applied to the primary coil of the high voltage transformer T11 by the switching action of the high speed switching means 14 is detected by the current detector 15a and the current transformer CT. The detected signal is applied to the input terminal I1 of the microprocessor 21a of the control circuit means 21. When a high potential signal is outputted from the output terminals P1 to P3, according to the detected signals applied to the input terminals I1 and I2 of the microprocessor 21a, one of transistors Q12 to Q14 corresponding to the selected output terminal conducts, so that the reference voltage applied to the inverting input terminal of the comparator CP11 can be determined. For example, if resistors R15, R17 and R18 are preset such that the resistance of the resistor R17 is higher than that of the resistor R15, but lower than that of the resistor R18, the reference voltage applied to the inverting input terminal of the comparator CP11 has a medium level when the transistor Q13 conducts, a level lower than the medium level when the transistor Q12 conducts, and a level higher than the medium level when the transistor Q14 conducts.

The reference voltage applied to the inverting input terminal of the comparator CP11 and then determined with its magnitude or level as above-mentioned is compared with the triangular wave from the triangular wave generator 21b, so that high and low potential periods of square wave signal from the comparator CP11 are determined depending upon the level of the reference voltage. The outputted square wave signal is applied to the switching transistor driver 14a to control the switching transistor Q1 to turn ON/OFF. Thus, ON/OFF periods of the switching transistor Q1 are determined depending upon the level of the reference voltage.

FIGS. 6A to 6E are waveform diagrams of voltages and currents outputted from respective portions of the circuit depending upon voltage the VBE applied between the base and the emitter of the switching transistor Q1. The output signals from the switching transistor drive 14a for determining base bias of the switching transistor Q1, are shown, respectively.

FIG. 6A is a waveform diagram showing a potential difference VCE applied between the collector and the emitter of the switching transistor Q1. This voltage is zero in the case when the switching transistor Q1 turns-on, and is resonated by means of the primary coil N11 of the high voltage transformer T11 and the resonance condenser C3 in the case when the switching transistor Q1 turns-off. At this time, the switching transistor Q1 can be operated to switch in the zero potential difference VCE. Thus, the distortion of the waveform or switching loss can be prevented.

FIG. 6B is a waveform diagram of a current ic flowing to the collector of the switching transistor Q1 through the primary coil N11. As shown in this figure, the current increases exponentially in the case when the switching transistor Q1 turns-on, and is zero in the case when it turns-off.

FIG. 6C is a waveform diagram in which it is shown that after a voltage greater than 2000 V (AC) is induced in the secondary coil N13 of the high voltage transformer T11, in case of switching-on of the switching transistor Q1, the voltage is then doubled during a half cycle up to about $-4000$ $V_{DC}$ by the high voltage condenser C2 and the high voltage diode D1. Thereafter about $-4000$ $V_{DC}$ is supplied to the magnetron MGT.

FIG. 6D is a waveform diagram showing an anode current flowing when $-4000$ $V_{DC}$ is applied between the anode electrode and the cathode electrode of the magnetron MGT.

Also, FIG. 6E is a waveform diagram of the bias voltage applied from the switching transistor driver 14a to the base of the switching transistor Q1 in response to the switch drive control signal from the control circuit means 11.

In FIGS. 6A to 6E, each frequency ranges from 20 KHz to 40 KHz.

As hereinbefore described, the present invention can provide a magnetron driving power supply circuit which is compact and light, and can linearly vary the output of electronic range because its output can be easily controlled, and can be applied to any apparatus without any design modification despite various types of power sources used (for example, 100 V, 110 V, 120 V, 200 V, 220 V, 240 V, 250 V: 50/60 Hz). Also, the magnetron driving power supply circuit according to the present invention can reduce the time for developing components such as the resonance transformer, the high voltage condenser and the like because it can use standard components of prior art, and can be applied to power supply circuits for other related apparatus of the inverter type.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A magnetron driving power supply circuit comprising:

input power rectifying means for inputting power from a commercial power source, and comprising means for stopping noise of the power and rectifying the noise-stopped power;

variable smoothing means coupled to said input power rectifying means and including a relay switch for smoothing the rectified power from said input power rectifying means in response to switching states of said relay switch;

magnetron driving means coupled to said variable smoothing means and including a magnetron for inputting the smoothed output power from said variable smoothing means and switching the smoothed output power at high speed to boost up to high voltage in order to drive said magnetron;

a low voltage transformer for inputting the power from said commercial power source and outputting a voltage less than that of the commercial power source;

low voltage rectifying means connected to rectify the output from said low voltage transformer;

low voltage smoothing means coupled to said low voltage rectifying means and said relay switch and including relay switch means for smoothing the rectified output power from said low voltage rectifying means in response to switching states of said relay switch;

relay driving means coupled to said relay switch means and said low voltage smoothing means for inputting the output from said low voltage transformer and controlling open/close operations of said relay switch means in accordance with output voltage levels from said low voltage transformer;

current level detecting means coupled to said magnetron driving means for detecting input current level of said magnetron driving means;

voltage level detecting means connected to said low voltage smoothing means for detecting output voltage level from said low voltage smoothing means;

constant voltage output means connected to said low voltage smoothing means for inputting output voltage from said low voltage smoothing means to output a constant voltage;

control circuit means coupled to said current level detecting means and said voltage level detecting means for inputting output voltage from said constant voltage output means as a drive voltage and for outputting a switching drive control signal in response to the detected signals from said current level detecting means and said voltage level detecting means; and high speed switching means coupled to said magnetron driving means and control circuit means for controlling high speed switching operation of said magnetron driving means in response to the switching drive control signal from said control circuit means.

2. A magnetron driving power supply circuit as recited in claim 1, wherein said control circuit means includes a microprocessor coupled to said current level detecting means and said voltage level detecting means for determining a potential level of a reference voltage in response to the detected signals from said current level detecting means and said voltage level detecting means and a triangular wave generator coupled to said microprocessor for outputting a signal to be compared with the reference voltage to generate the switching drive control signal.

* * * * *